Feb. 12, 1924.
1,483,470
A. J. F. MONTABONE
EQUALIZING SPEEDS OF MOTOR DRIVES
Filed July 6, 1921
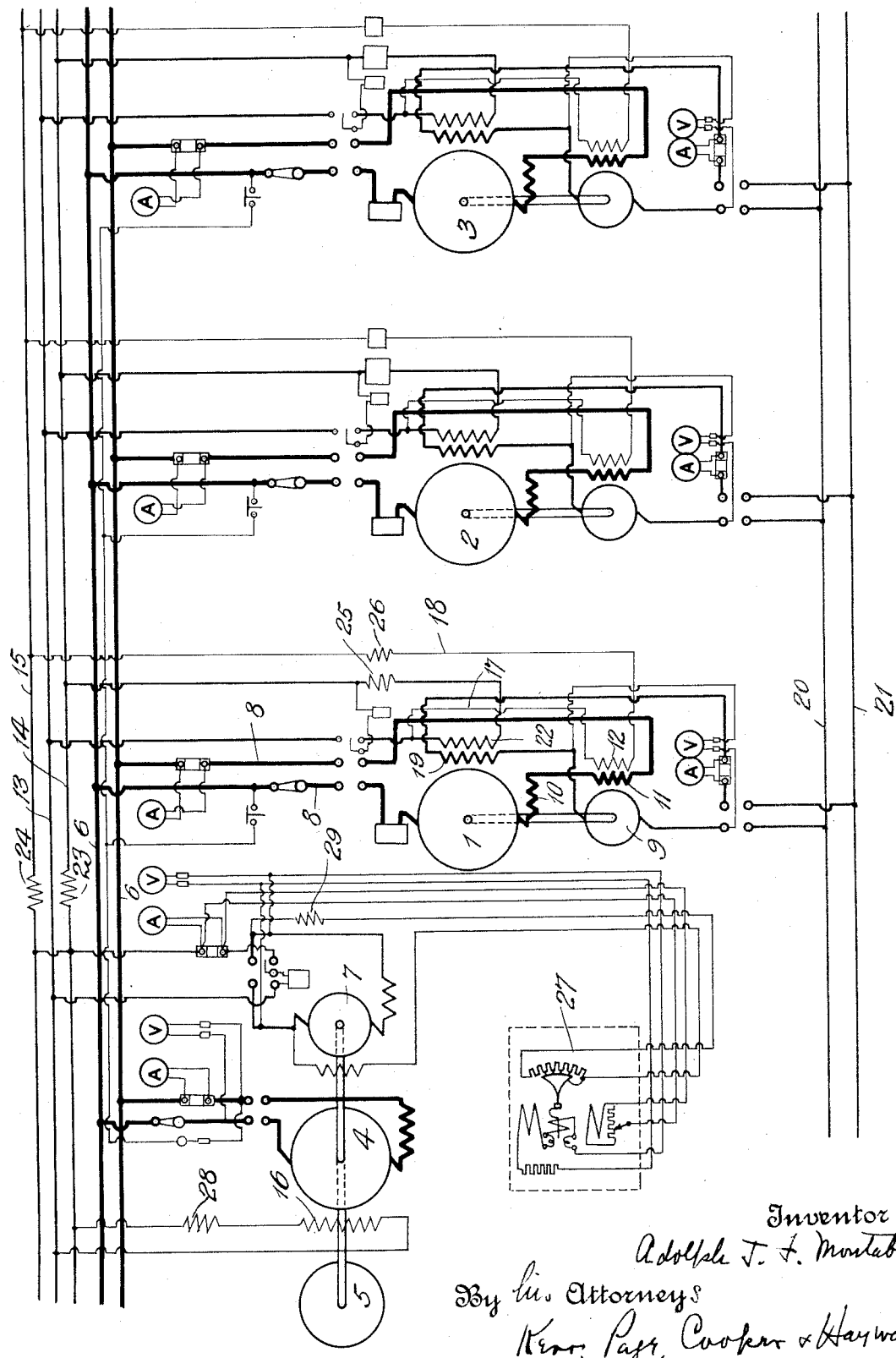

Patented Feb. 12, 1924.

1,483,470

UNITED STATES PATENT OFFICE.

ADOLPH J. F. MONTABONE, OF MONTREAL, QUEBEC, CANADA, ASSIGNOR TO GENERAL ELECTRIC COMPANY, A CORPORATION OF NEW YORK.

EQUALIZING SPEEDS OF MOTOR DRIVES.

Application filed July 6, 1921. Serial No. 482,726.

*To all whom it may concern:*

Be it known that I, ADOLPH J. F. MONTABONE, a subject of the King of Great Britain, residing at Montreal, Province of Quebec, Dominion of Canada, have invented certain new and useful Improvements in Equalizing Speeds of Motor Drives, of which the following is a full, clear, and exact description.

In certain branches of industry, of which, for purposes of illustration in this application I may select the art of paper making as typical, it is necessary to employ a plurality of motors for driving the different parts of the apparatus. The scale on which these operations are now carried on, the speed required for economical operation and other considerations make it necessary to use an electric generator and a plurality of motors run thereby, and it is further required that these motors whatever their speeds shall always run at a certain definite relative speed to one another the fixed limits of variation being imperatively narrow. This has been recognized in the art and provision made for securing the proper conditions by the use of various instrumentalities, but heretofore such means have been complicated, cumbersome and expensive.

The object of my present invention is to secure a more simple, efficient and practicable sectional electrical machine drive, in which the all-important problem of substantially perfect regulation of speed both absolute and relative is solved by less complicated and elaborate means than have heretofore been found necessary and this object I have accomplished by combining with the several motors means which respond to any variation in speed to correct not only such variation in the varying motor itself but to react upon the other motors to maintain the same relative speeds in all of them.

The success of the plan which I have devised involves the use of no unusual or untried devices but results from the manner of combining and using the same and the invention may be most readily comprehended from the detailed description of the diagram hereto annexed which illustrates in detail the means which I employ and the manner in which they are associated and combined for use.

As stated above the invention is illustrated as applied to a paper making machine as such use is broadly typical of many others where similar conditions obtain. The diagram, therefore, shows an arbitrary number, in this case three, of motors 1, 2 and 3, each connected to or geared in any proper manner with the different parts of a paper making machine which they are used to drive. The main generator 4 is driven in any suitable manner by any proper prime mover 5, such as an engine, water power or the like, and in the present case both the generator and the motors are assumed to be adapted and designed for direct current.

Manifestly, if the first motor 1 drives that part of the machine which produces the wet paper from the pulp and the other motors, whatever their number, drive those parts of the machine which receive and finish this paper, all of the motors must preserve substantially the same exact relative speeds as otherwise the soft sheet would be injured by the rolls running too fast or too slow and this relation of speed is maintained by the means which I shall now describe.

There are certain parts of the system illustrated in the diagram which require little or no detailed explanation as they are the well known accessories of such a plant. Suffice it therefore to point out that the main generator 4 of a capacity varying according to that required, is connected through suitable switches with the main bus bars 6, 6, and is provided with a separately excited field coil 16 supplied with current from a separate exciter 7 which feeds into master field bus bars 13, 14 and 15; and that both generator and exciter are equipped with the proper resistances 28 and 29 in their fields which are capable of variation, instruments, switches and other appliances for controlling the voltage for different speeds.

In like manner each motor is connected with the bus bars 6 through circuit breakers and switches and is provided with the necessary instruments and other accessories for aiding in its control and regulation. One motor with its connections and accessories is the counterpart of another so that only one need be described in detail.

Each motor is separately excited, the commutating field coils being indicated by 10, and is connected with bus bars 6 by conductors 8. In gear or directly connected with the motor is an auxiliary machine 9 which is capable of running either as a motor or as a generator with field coils 11 in the circuit of the main motor and separately excited field coil 12 in circuits 17 and 18 from field bus bars 15 and 13. The armature circuit of this auxiliary machine includes supplemental field coils 19 in the main motor and is adapted for connection by a suitable switch to auxiliary or tie bus bars 20, 21.

The main motor has also separately excited fields 22, supplied from a master field bus bar and it will be observed that the series fields 19 are of heavier wire and are in series with the armature of machine 9 which is in series parallel with the tie bus bars 20 and 21.

With the above description of means supplemented by reference to other parts of the system which are well known and understood by those skilled in the art, the operation of the apparatus will be readily understood by the following description.

Assuming the main generator to be started up and the voltage thereon raised to the operating or starting conditions by the adjustment or regulation of the current from the exciter 7, the proper switches are closed to put energy on the main bus bars and the main motors are then brought one by one up to the proper speed and the auxiliary machines 9 are then connected up with the auxiliary or tie bus bars. Should it become necessary to change the speed of the main motors as a unit this is accomplished by the adjustment of resistance 28, the finer adjustments by master resistances 23 and 24, respectively, all motors being simultaneously controlled at one point by this means.

Should it become necessary to change at any time the speed of any particular one of the main motors and its auxiliary machine 9, this may be done by the adjustment of the resistances 25 and 26, respectively.

The proper running conditions having been thus established it may well happen for many reasons, such as a more or less pronounced variation in load that one of the main motors 1, 2 or 3 tends to speed up and this condition should be immediately met and provided against. Any such increase in speed, however, causes the auxiliary machine connected with it to operate as a generator and to produce through the coil 19 a current which strengthens the main motor field which has a tendency to lower the speed of the motor and at the same time drives through the tie bus bars, 20, 21 the other auxiliary machine 9 as motors, in addition weakening the fields of the main motors which are connected to them.

On the other hand should any of the main motors tend to slow up the reverse action to that described takes place. In other words if the speed of one of the main motors is decreased, the auxiliary machine connected thereto will generate a lower potential than the generated potential of the remainder of the auxiliary machines so that current will be caused to flow through the fields 19 of the motors in such a direction that the excitation of the main motor which is momentarily running at a lower speed than its proper relative speed with respect to the remainder of the motors, is decreased and the excitation of the remainder of the motors is increased. The speed of the one motor will thus be increased and the speeds of the remainder of the motors will be decreased so that the predetermined speed relation will be quickly restored.

Under such conditions together with the action of any proper form of regulator 27 for maintaining constant potential on the master field bus bars 13 and 14, all of the main motors will continue to operate at their fixed and predetermined relative speeds.

This, in the main, is the theory of operation of the system. To one skilled in the art the purpose, the manner of using the supplemental fields of the generator, and the supplemental fields of the motors and the auxiliary machines for ready and fine regulation of voltage, speed and other operative conditions will be well understood and I do not go into these matters in greater detail as they are not of the essence of my invention. It suffices to point out that by means of these devices such adjustments are made that under the proper and required conditions of speed of the motors the auxiliary machines have no effect upon their fields but that upon any increase of such speed the latter act as generators to strengthen the field of their associated motor and weaken the fields of the other motors and conversely, with the result that all of the motors will preserve the same fixed relative speeds.

It has been demonstrated that this system secures a speed regulation of almost perfect character and much closer, in fact, than that heretofore obtained by any other system of the kind. Once adjusted the conditions sought for by such adjustment are permanently maintained and the apparatus requires no further attention other than the usual care and observation.

What I claim as my invention is:—

1. In a direct current motor system of the kind described, the means for maintaining the fixed relative speed of a plurality of electrically connected driving motors which are adjusted or adapted to run at varying speeds, comprising the combination with each of said motors of a machine capable of running either as a motor or as a generator and mechanically connected to its respective motor, supplemental field coils for all of the motors, connected with the armature circuits of said machines, and means for adjusting the said motors and said machines in the manner set forth.

2. In a direct current motor system of the kind described, the means for maintaining the fixed relative speed of a plurality of electrically connected driving motors, comprising the combination with each of said motors, which are adjusted or adapted to run at varying speeds, of an auxiliary machine capable of running either as a motor or as a generator and driven by said motor, field coils for said auxiliary machines in series with the motors, supplemental coils for the motors in the armature circuits of said machines, a tie circuit common to all the auxiliary machines to which the armature circuits of said machines are connected, and means for regulating and adjusting the motors and said auxiliary machines in the manner set forth.

3. In a system of the kind described, the combination with a source of driving current of regulatable constant potential, a circuit from the said source, electric motors connected in multiple therewith, a machine capable of running either as a motor or as a generator driven by each of said motors, supplemental field coils for said motors in the armature circuits of said machines, and tie bus bars to which the said armature circuits are also connected.

4. In a system for maintaining a predetermined speed relation of a plurality of separate driving motors, a separate auxiliary direct current dynamo electric machine mechanically connected to each of the respective driving motors, field windings connected to be energized by the said auxiliary machines for controlling the speed of said motors, and connections whereby the voltages of the said auxiliary machines oppose each other and the resultant voltage of the said machines occasioned by the variation of the speed of a portion of the said motors from the predetermined speed relation energizes the said controlling field windings to produce a speed change of the said portion of the motors in one direction and a speed change of the remainder of the motors in the opposite direction to restore the predetermined speed relation of the motors.

5. In a system for maintaining a predetermined speed relation of a plurality of separate driving motors, a separate auxiliary direct current dynamo electric machine, mechanically connected to each of the respective driving motors, field windings connected to be energized by the said auxiliary machines for controlling the speed of the said motors, means for varying the relative speeds of the driving motors and the voltages of the auxiliary machines to predetermine a speed relation of the motors to be maintained, and connections whereby the voltages of the said auxiliary machines oppose each other and the resultant voltage of the said machines, occasioned by the variation of the speed of a portion of the motors from the predetermined speed relation, energizes the said controlling field windings to produce a speed change of the said portion of the motors in one direction and a speed change of the remainder of the motors in the opposite direction to restore the predetermined speed relation of the motors.

6. In a system for maintaining a predetermined speed relation of a plurality of separate driving motors, a separate auxiliary direct current dynamo electric machine mechanically connected to each of the respective driving motors, each of said motors having a controlling field winding connected in series relation with the armature of its associated auxiliary machine, and connections whereby the voltages of the said auxiliary machines oppose each other and the exchange current of said machines, occasioned by variation of a speed of a portion of the motors from the predetermined speed relation, energizes the controlling field winding or windings of the said portion of the motors in one direction and energizes the controlling field winding or windings of the remainder of the motors in the opposite direction to restore the predetermined speed relation of the motors.

7. In a system for maintaining a predetermined speed relation of a plurality of separate driving motors, a separate auxiliary direct current dynamo electric machine mechanically connected to each of the respective driving motors, each of said motors having a controlling field winding connected in series relation with the armature of its associated auxiliary machine, and a tie bus to which the armatures of said auxiliary machines are connected with their respective voltages opposing each other and through which flows the exchange current of said machines, occasioned by a variation of the speed of a portion of the motors from the predetermined speed relation, to energize the controlling field winding or windings of the said portion of the motors in one direction, and to energize the controlling field winding or windings of the remainder of the motors in the opposite direction to restore the predetermined speed relation of the motors.

8. In a system for maintaining a predetermined speed relation of a plurality of separate driving motors, a separate auxiliary direct current dynamo electric machine mechanically connected to each of the respective driving motors, each of said motors having a controlling field winding connected in series relation with the armature of its associated auxiliary machine, means for varying the relative speeds of the driving motors and the voltages of the auxiliary machines to predetermine a speed relation to be maintained, and a tie bus to which the armatures of said auxiliary machines are connected with their respective voltages opposing each other and through which flows the exchange current of said machines, occasioned by a variation of the speed of a portion of the motors from the predetermined speed relation, to energize the controlling field winding or windings of the said portion of the motors in one direction, and to energize the controlling field winding or windings of the remainder of the motors in the opposite direction to restore the predetermined speed relation of the motors.

9. In a system for maintaining a predetermined speed relation of three or more separate driving motors, an auxiliary direct current dynamo electric machine mechanically connected to each of said motors, a tie bus to which the armatures of the said auxiliary machines are connected with their respective voltages opposing each other, and means energized responsively to the exchange of current through the said tie bus occasioned by the variation of the speed of any portion of the said motors from the predetermined speed relation for causing a speed change of the said portion of the motors in one direction and a speed change of the remainder of the motors in the opposite direction to restore the predetermined speed relation of the motors.

In testimony whereof I hereto affix my signature.

ADOLPH J. F. MONTABONE.